US012572709B2

(12) United States Patent
Jhang et al.

(10) Patent No.: US 12,572,709 B2
(45) Date of Patent: Mar. 10, 2026

(54) ELECTRONIC DEVICE

(71) Applicant: HTC Corporation, Taoyuan City (TW)

(72) Inventors: Jhih-Ming Jhang, Taoyuan City (TW);
Ching Yuan Hu, Taoyuan City (TW);
Chun-Lung Chu, Taoyuan City (TW)

(73) Assignee: HTC Corporation, Taoyuan City (TW)

( * ) Notice: Subject to any disclaimer, the term of this patent is extended or adjusted under 35 U.S.C. 154(b) by 81 days.

(21) Appl. No.: 18/641,447

(22) Filed: Apr. 22, 2024

(65) Prior Publication Data

US 2025/0328695 A1　Oct. 23, 2025

(51) Int. Cl.
*G06F 21/00* (2013.01)
*G06F 21/62* (2013.01)
*G06F 21/86* (2013.01)
*H05K 5/02* (2006.01)

(52) U.S. Cl.
CPC .......... *G06F 21/86* (2013.01); *G06F 21/6245* (2013.01); *H05K 5/0208* (2013.01)

(58) Field of Classification Search
None
See application file for complete search history.

(56) References Cited

U.S. PATENT DOCUMENTS

2010/0106289 A1* 4/2010 Moh ................ G07B 17/00193
700/227
2015/0208527 A1 7/2015 Lee et al.
2021/0257790 A1 8/2021 Sasaki et al.

FOREIGN PATENT DOCUMENTS

| CN | 105930746 | A | * | 9/2016 | ............. | G06F 21/78 |
|----|-----------|---|---|--------|-----------|------------|
| CN | 105930746 |   |   | 1/2019 | | |
| CN | 112996219 | A | * | 6/2021 | .......... | H05K 1/0275 |
| CN | 112996219 |   |   | 5/2022 | | |
| TW | M325654 |   |   | 1/2008 | | |

OTHER PUBLICATIONS

"Office Action of Taiwan Counterpart Application", issued on Jan. 21, 2025, p. 1-p. 7.

* cited by examiner

*Primary Examiner* — Andrew J Steinle
(74) *Attorney, Agent, or Firm* — JCIPRNET

(57) ABSTRACT

An electronic device includes a first casing, a second casing, a storage chip, a detection loop, and a data clearing circuit. The second casing is assembled to the first casing and forms an accommodation space together. The storage chip is disposed in the accommodation space. The detection loop is electrically connected to the storage chip. The detection loop includes a first section and a second section that are physically connected. The first section is fixed to first casing. The second section is fixed to second casing. The data clearing circuit electrically connects the storage chip and detection loop. When the first casing is separated from the second casing, the first section and the second section are physically disconnected, and the data clearing circuit is powered to clear data stored in the storage chip.

6 Claims, 3 Drawing Sheets

ELECTRONIC DEVICE

BACKGROUND

Technical Field

This application relates to a device, and in particular to an electronic device.

Description of Related Art

In recent years, with the development of digital financial technology, electronic wallet has become more and more popular. Since electronic wallets store confidential and valuable information, they require security features to prevent unauthorized access and protect the user's assets. Similarly, information of a confidential nature is also stored in electronic devices such as smartphones and head-mounted electronic devices. For this reason, providing effective protection mechanisms for these electronic devices has been an ongoing goal for technologists in this field.

SUMMARY

This application provides an electronic device to address the potential theft of information inside the electronic device.

The electronic device of this application includes a first casing, a second casing, a storage chip, a detection loop, and a data clearing circuit. The second casing is assembled to the first casing and forms an accommodation space together. The storage chip is disposed in the accommodation space. The detection loop is electrically connected to the storage chip. The detection loop includes a first section and a second section that are physically connected. The first section is fixed to first casing. The second section is fixed to second casing. The data clearing circuit electrically connects the storage chip and detection loop. When the first casing is separated from the second casing, the first section and the second section are physically disconnected, and the data clearing circuit is powered to clear data stored in the storage chip.

Based on the above, in the electronic device of this application, once the detection loop is physically disconnected, the data stored in the storage chip will be cleared. Thus, the data stored in the electronic device may be effectively protected.

DESCRIPTION OF THE EMBODIMENTS

Figure 1:
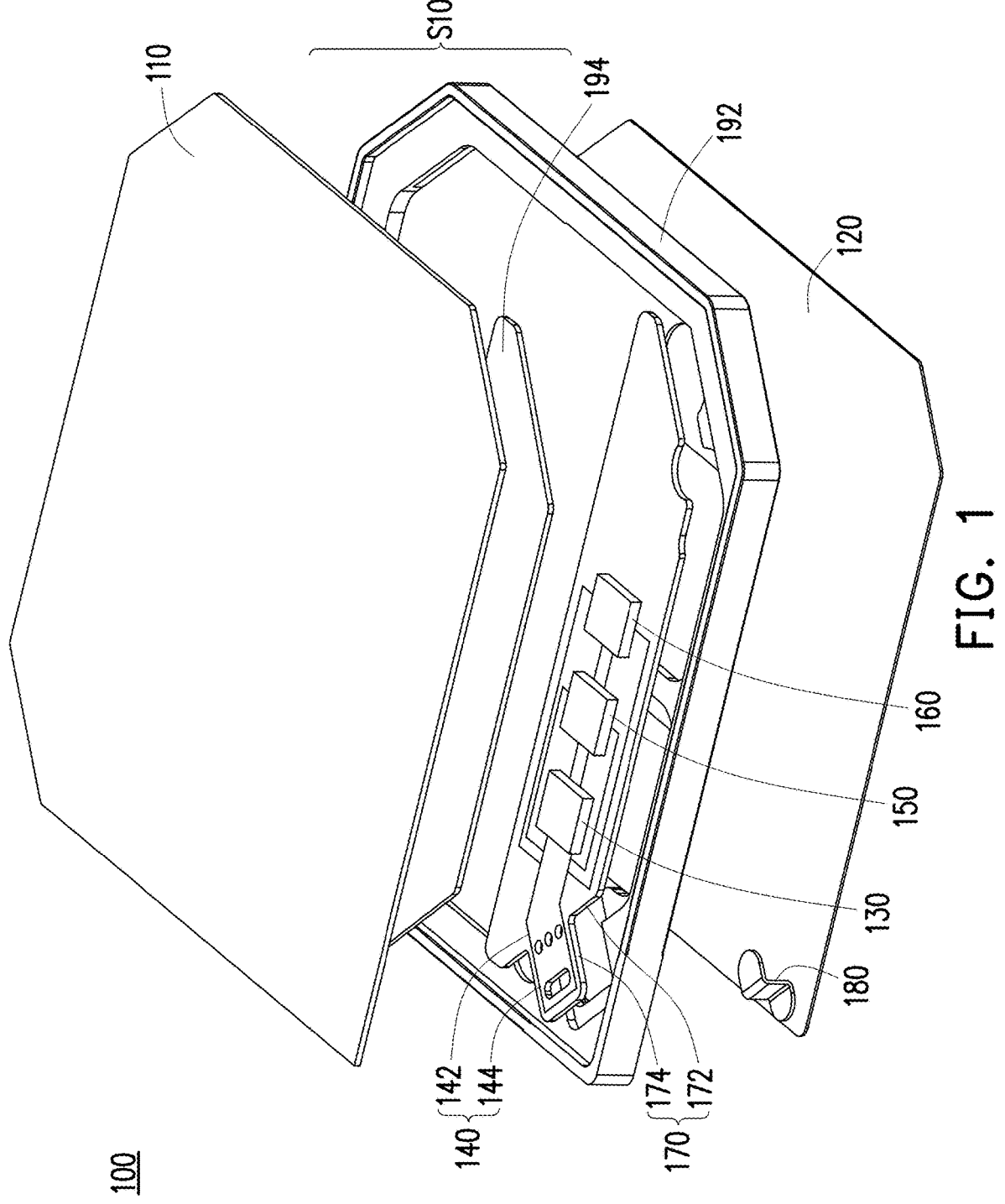
FIG. 1 is a schematic diagram of a disassembled state of an electronic device according to an embodiment of the invention.
Figure 2:
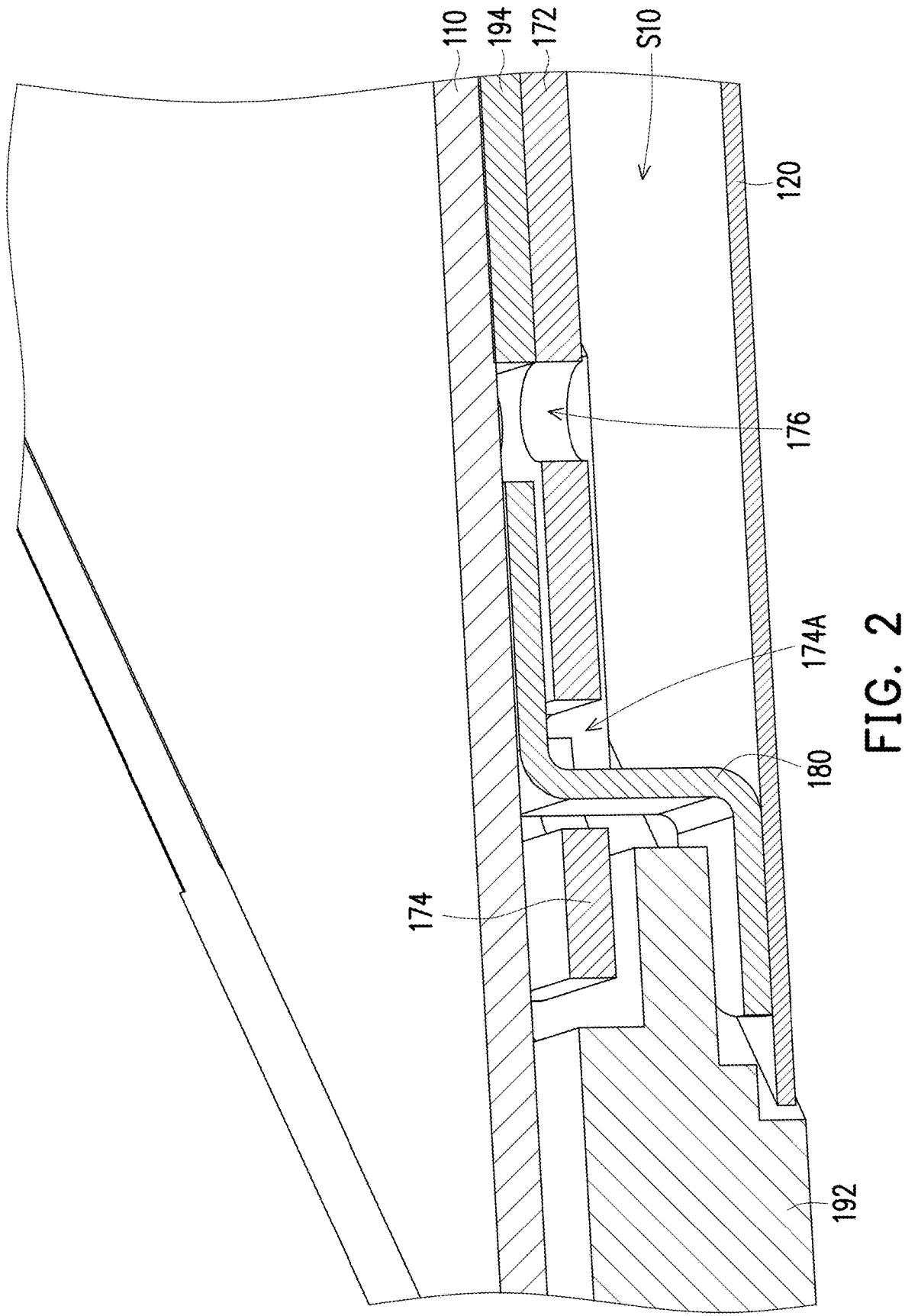
FIG. 2 is a partial cross-sectional diagram of the electronic device of FIG. 1 in an assembled state.

FIG. 1 is a schematic diagram of a disassembled state of an electronic device according to an embodiment of the invention. FIG. 2 is a partial cross-sectional diagram of the electronic device of FIG. 1 in an assembled state. Please refer to FIG. 1 and FIG. 2. An electronic device 100 of this embodiment includes a first casing 110, a second casing 120, a storage chip 130, a detection loop 140, and a data clearing circuit 150. The second casing 120 is assembled to the first casing 110 and forms an accommodation space S10 together. The storage chip 130 is disposed in the accommodation space S10. The detection loop 140 is electrically connected to the storage chip 130. The detection loop 140 includes a first section 142 and a second section 144 that are physically connected. The first section 142 is fixed to the first casing 110. The second section 144 is fixed to the second casing 120. The data clearing circuit 150 is electrically connected to the storage chip 130 and the detection loop 140.

The fact that the first section 142 is fixed to the first casing 110 means that the first section 142 is directly or indirectly fixed to the first casing 110, and when being moved, the first casing 110 moves with the first section 142. Similarly, the fact that the second section 144 is fixed to the second casing 120 means that the second section 144 is directly or indirectly fixed to the second casing 120, and when being moved, the second casing 120 moves with the second section 144.

Since the first section 142 is fixed to the first casing 110 and the second section 144 is fixed to the second casing 120, when the first casing 110 is separated from the second casing 120, the first section 142 and the second section 144 are also physically disconnected. When the first section 142 and the second section 144 of the detection loop 140 are physically disconnected, the data clearing circuit 150 clears the data stored in the storage chip 130 when powered. That is, when someone attempts to destroy the electronic device 100 by external force to obtain the internal storage chip 130, the data stored in the storage chip 130 is cleared and is not obtained by the destroyer. Thus, the holder of the electronic device 100 does not need to worry about the data stored in the storage chip 130 being stolen. Of course, the holder of the electronic device 100 can obtain and use the data stored in the storage chip 130 through identity verification without damaging the electronic device 100.

For example, the storage chip 130 stores financial information. That is, the electronic device 100 can be an electronic wallet or a personal key. Since the electronic device 100 has the above-mentioned protection mechanism, it can protect the financial security of users. In other embodiments, the electronic device 100 may also be a head-mounted display device or other electronic device. Since the electronic device 100 may also store personal biometrics or other confidential information of the users, the electronic device 100 with the above protection mechanism allows the user to use the electronic device with peace of mind, in which the personal biometrics include fingerprints, face, retinas, iris, etc.

In this embodiment, the electronic device 100 may further include an energy storage element 160 connected to and configured to supply power to the data clearing circuit 150 and the detection loop 140. Since the energy storage element 160 supplies power to the detection loop 140, it can be determined whether the first section 142 and the second section 144 are connected or physically disconnected according to whether the detection loop 140 forms an electrically conductive loop. When the energy storage element 160 supplies power to the data clearing circuit 150 and it is determined that the first section 142 and the second section 144 are physically disconnected, the data clearing circuit 150 clears the data stored in the storage chip 130. The energy storage element 160 is, for example, a capacitor or other energy storage element.

When the electronic device 100 does not include the energy storage element 160, a power supply is required whenever an attempt is made to read the data stored in the storage chip 130. At the same time, the data clearing circuit 150 and the detection loop 140 also receive power, so it can also be determined whether the first section 142 and the second section 144 are physically disconnected. When it is determined that the first section 142 and the second section 144 are physically disconnected, the data clearing circuit 150 also clears the data stored in the storage chip 130.

Figure 3:
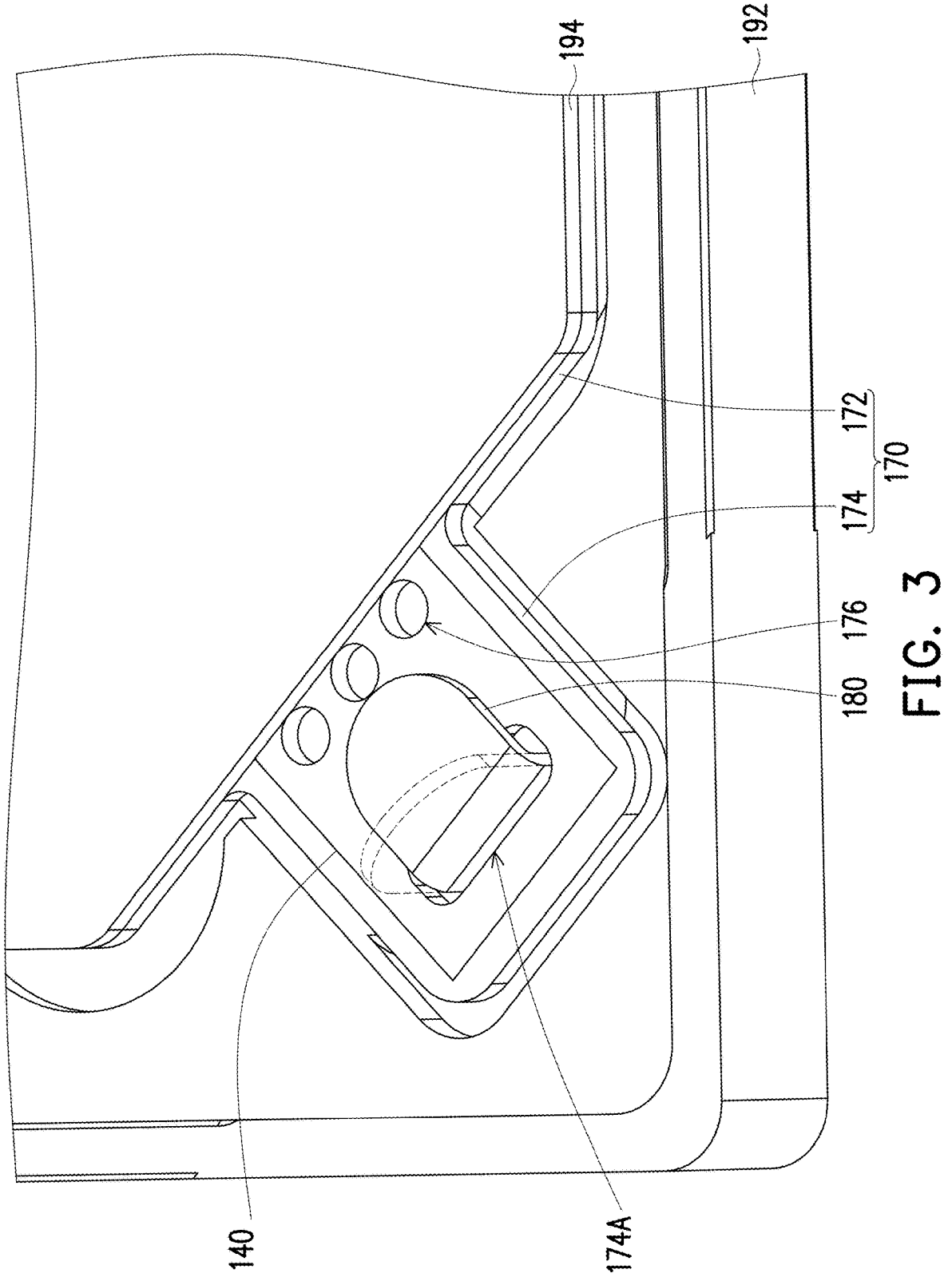
FIG. 3 is a partial schematic diagram of the electronic device in FIG. 1 after removing a first casing.

FIG. 3 is a partial schematic diagram of the electronic device in FIG. 1 after removing a first casing. Please refer to FIG. 2 and FIG. 3. In this embodiment, the electronic device 100 further includes a circuit board 170. The detection loop 140 and the storage chip 130 are disposed on the circuit board 170. The circuit board 170 includes a main board 172 and a tongue board 174 that are connected. The first section 142 of the detection loop 140 and the storage chip 130 are located on the main board 172. The second section 144 of the detection loop 140 is located at the tongue board 174. The main board 172 is fixed to the first casing 110. That is, the main board 172 is directly or indirectly fixed to the first casing 110, and when being moved, the first casing 110 moves with the main board 172. The tongue board 174 is fixed to the second casing 120. That is, the tongue board 174 is directly or indirectly fixed to the second casing 120, and when being moved, the second casing 120 moves with the tongue board 174.

Thus, when someone attempts to destroy the electronic device 100 by external force to obtain the internal storage chip 130, the first casing 110 and the second casing 120 are separated, the main board 172 and the tongue board 174 are also separated, and the first section 142 and the second section 144 are physically disconnected accordingly.

In this embodiment, the circuit board 170 is formed as a single unit, and the circuit board 170 has a row of through holes 176 at a junction of the main board 172 and the tongue board 174. Since the circuit board 170 is originally formed as a single unit, to ensure that the main board 172 and the tongue board 174 would be damaged from the junction of the two, a row of through holes 176 is disposed at the junction.

In this embodiment, the electronic device 100 further includes a fastener 180 fixed to the second casing 120. The tongue board 174 has a fastening hole 174A. The fastener 180 is threaded through the fastening hole 174A and clamps the tongue board 174 between the fastener 180 and the second casing 120. For example, the fastener 180 may be welded to the second casing 120, and a portion of the fastener 180 that is not fixed to the second casing 120 can be threaded through the fastening hole 174A, and then a portion of the fastener 180 that is threaded through the fastening hole 174A can be bent over the tongue board 174, so that when the second casing 120 is moved, the tongue board 174 can be moved along with the second casing 120 via the fastener 180.

In this embodiment, the electronic device 100 may further include a frame 192 and an adhesive layer 194. The frame 192 is configured to provide support between the first casing 110 and the second casing 120. The main board 172 of the circuit board 170 is fixed to the first casing 110 via the adhesive layer 194. In addition, although the storage chip 130, the detection loop 140, the data clearing circuit 150, and the energy storage element 160 in FIG. 1 are disposed on an upper surface of the circuit board 170, in other embodiments, these elements can also be disposed on a lower surface of the circuit board 170. In this way, the circuit board 170 can be fixed to the first casing 110 via the adhesive layer 194 from a flat upper surface.

To sum up, in the electronic device of this application, whenever the electronic device is damaged and the first and second casings are separated, the detection loop is physically disconnected and the data stored in the storage chip is cleared by the data clearing circuit. Thus, the data stored in the electronic device may be effectively protected.

What is claimed is:

1. An electronic device, comprising:
a first casing;
a second casing, assembled to the first casing and forming an accommodation space together;
a storage chip, disposed in the accommodation space;
a detection loop, electrically connected to the storage chip, wherein the detection loop comprises a first section and a second section physically connected with each other, the first section is fixed to the first casing, and the second section is fixed to the second casing;
a data clearing circuit, electrically connecting the storage chip and the detection loop, wherein when the first casing is separated from the second casing, the first section is physically disconnected from the second section, and the data clearing circuit is powered to clear data stored in the storage chip; and
a circuit board, wherein the detection loop and the storage chip are disposed on the circuit board, the circuit board comprises a main board and a tongue board connected with each other, the first section and the storage chip are located on the main board, the second section is located on the tongue board, the main board is fixed to the first casing, and the tongue board is fixed to the second casing.

2. The electronic device according to claim 1, further comprising an energy storage element connected and configured to supply power to the data clearing circuit and the detection loop.

3. The electronic device according to claim 2, wherein the energy storage element comprises a capacitor.

4. The electronic device according to claim 1, wherein the storage chip stores financial information.

5. The electronic device according to claim 1, wherein the circuit board is formed as a single unit, and the circuit board has a row of through holes at a junction of the main board and the tongue board.

6. The electronic device according to claim 1, further comprising a fastener fixed to the second casing, wherein the tongue board has a fastening hole, the fastener is threaded through the fastening hole and clamps the tongue board between the fastener and the second casing.

* * * * *